United States Patent [19]
Kakizaki

[11] Patent Number: 5,627,923
[45] Date of Patent: May 6, 1997

[54] THREE-DIMENSIONAL OPTO-ELECTRIC INTEGRATED CIRCUIT USING OPTICAL WIRING

[75] Inventor: Sunao Kakizaki, Dublin, Ireland

[73] Assignee: Hitachi, Ltd., Tokyo, Japan

[21] Appl. No.: 307,239

[22] Filed: Sep. 16, 1994

[30] Foreign Application Priority Data

Sep. 16, 1993 [JP] Japan ................................. 5-229869

[51] Int. Cl.⁶ ...................................................... G02B 6/12
[52] U.S. Cl. ............................. 385/14; 385/33; 385/36
[58] Field of Search ........................ 250/578.1; 347/238, 347/241, 243, 244; 385/14, 33, 36; 372/50, 97

[56] References Cited

U.S. PATENT DOCUMENTS

| | | | |
|---|---|---|---|
| 5,017,986 | 5/1991 | Rouse | 357/30 |
| 5,245,680 | 9/1993 | Sauter | 385/24 |
| 5,351,259 | 9/1994 | Ishimori et al. | 372/97 |
| 5,365,541 | 11/1994 | Bullock | 372/97 |

FOREIGN PATENT DOCUMENTS

| | | |
|---|---|---|
| 0477036A2 | 3/1992 | European Pat. Off. . |
| 0530551A1 | 3/1993 | European Pat. Off. . |
| 57-15465 | 1/1982 | Japan . |
| 59-75656 | 4/1984 | Japan . |
| 60-169167 | 9/1985 | Japan . |
| 61-743391 | 4/1986 | Japan . |
| 61-500941 | 5/1986 | Japan . |
| 61-156871 | 7/1986 | Japan . |
| 61-212059 | 9/1986 | Japan . |
| 61-253862 | 11/1986 | Japan . |
| 62-181467 | 8/1987 | Japan . |
| 1307707 | 12/1989 | Japan . |

OTHER PUBLICATIONS

Balliet et al., "Optical Transmission System for Interconnecting Electronic Units," IBM Technical Disclosure Bulletin, vol. 26, No. 4, Sep., 1983, pp. 1793–1796.

39th Meeting Of Applied Physical Society, Spring–lecture preprint No. 30, P–B–9, p. 844.

Applied Optics, vol. 29, No. 8, pp. 1077–1093, 1990, "Optical interconnections for massively parallel architechtures".

Proceedings the IEEE, vol. 72, No. 7, Jul., 1984, pp. 850–866, "Optical interconnections for VLSI System".

Applied Optics, vol. 27, No. 15, Aug., 1988, pp. 3155–3160, "Crossover networks and their optical implementation".

Applied Optics, vol. 21, No. 19, Oct. 10, 1982, p. 3456 "Stacked planar Optics"; an application of the planar microlens.

Applied Optics, vol. 29, No. 14, May 10, 1990, p. 1998, "Integrated Optical imaging system".

Applied Optics, vol. 30, No. 25, 1991, p. 3643, "Diffraction–limited blazed reflection diffractive microlenses for oblique incidence fabricated by electron–beam lithography".

Primary Examiner—Scott J. Sugarman
Assistant Examiner—Thomas Robbins
Attorney, Agent, or Firm—Antonelli, Terry, Stout & Kraus, LLP

[57] ABSTRACT

Optimal winding techniques usable in various information processors are handled. An opto-electric integrated circuit is provided which is excellent in productivity and alignment for free space interconnection.

A three-dimensional opto-electric integrated circuit includes an active element substrate having a two-dimensional plane on which a plurality of active elements is disposed, and a passive element formed separately from the two-dimensional plane. The passive element includes a plurality of lenses disposed in correspondence to the plurality of active elements and a plurality of recursive reflectors for performing an optical path separating operation and an optical turning-back reflective operation to allow rays of light from the active elements to sequentially pass through the lenses and to propagate through the active elements, whereby the propagation of rays of light through a free space is used to optically interconnect the active elements one to the other.

19 Claims, 14 Drawing Sheets

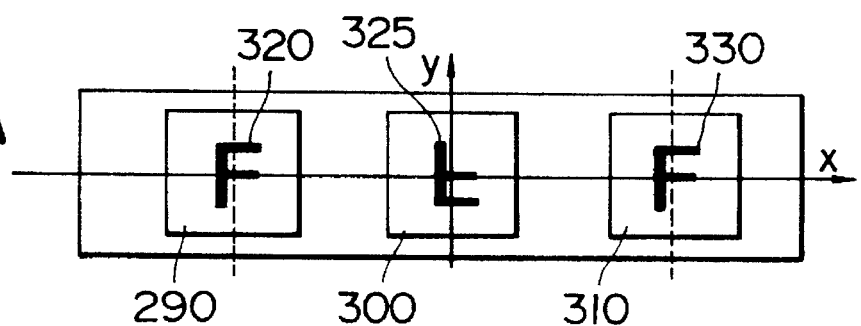
FIG. 7A
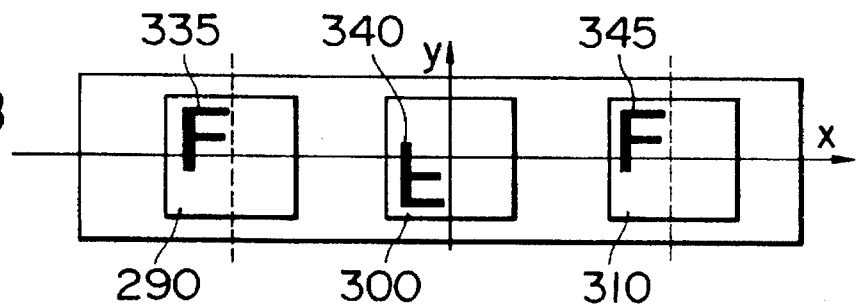
FIG. 7B
FIG. 8
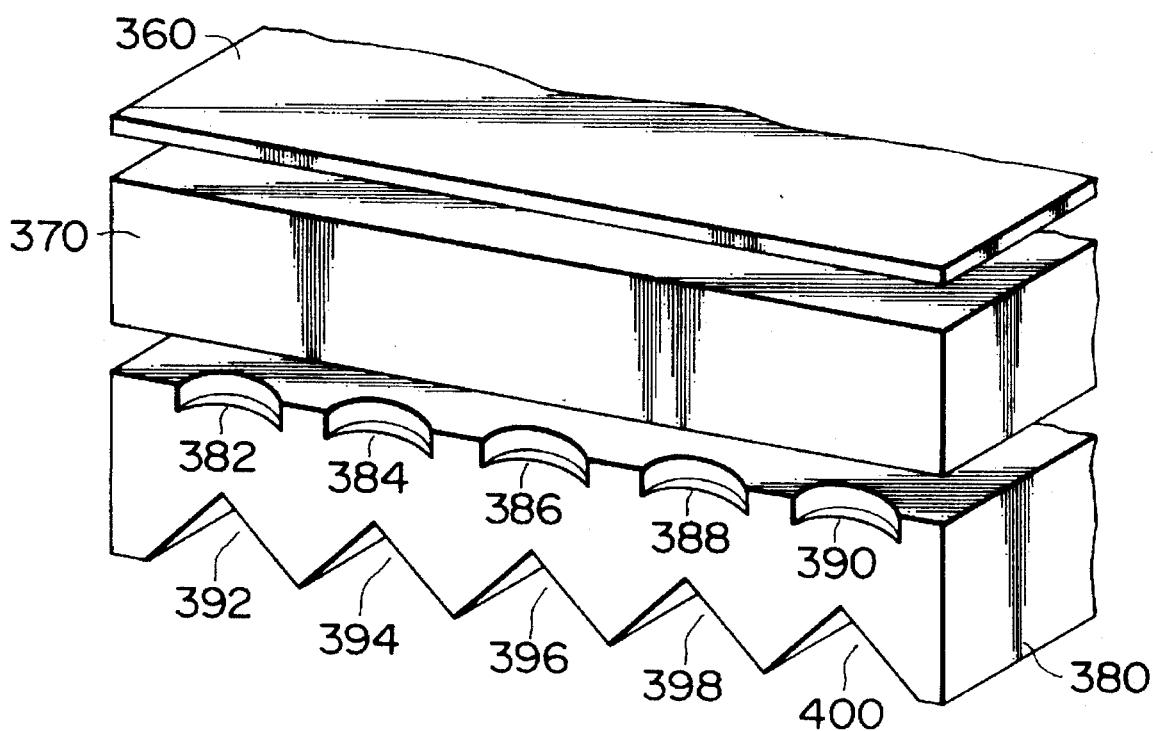

PLANAR OPTICAL DEVICES

THREE-DIMENSIONAL OPTO-ELECTRIC INTEGRATED CIRCUIT USING OPTICAL WIRING

BACKGROUND OF THE INVENTION

The present invention relates to optical wiring for information processors such as computers, exchanges or neural networks, and more particularly to an opto-electric integrated circuit which realizes optical wiring which delivers massive optical information at high speed through a free space.

Recently, the processing ability of various information processors including computers and digital exchanges has remarkably been improved, which is mainly achieved by an increase in the density of formed semiconductor integrated circuits and hence a decrease in the propagation distance of signals through the semiconductor integrated circuits, which results in an increase in the processing speed of the semiconductor integrated circuit, based on the progress of semiconductor integration techniques in view of the fact that all signals propagate at a limited speed.

Formation of a large-scaled integrated circuit brought about by maturity of such semiconductor integration techniques increases the number of wiring conductors in a chip or the number of output pins of the chip, which, in turn, increases the number of wiring conductors in the substrate and between the substrate and the devices on the substrate. After all, an increase in the number of interconnected leading conductors in the whole system cannot be avoided. In addition, the problem of cross talk due to mutual interference of signals caused by an increase in the density of formed integrated circuits, and the problems of a clock skew caused by different lengths of the optical wiring conductors caused by an increased operational speed of the device, a delay of propagation of signals, mismatching of the impedances of the signal passageways, and insufficiency of the bands of the signal passageways have become serious.

In order to solve such bottlenecks of the communication, optical wiring techniques are used which have the features including mutual non-inductivity of signals, high resistance to electromagnetic troubles, wide band of interconnected passageway conductors, high speed of signal propagation and elimination of the necessity of grounding. The methods of optical wiring are mainly divided into waveguide type interconnection and free-space type interconnection. The former includes the formation of a waveguide in a two-dimensional plane and optical interconnection of active elements such as semiconductor lasers, photodiodes and/or spatial optical modulation elements (in more detail, see published unexamined Japanese patent applications JP-A-57-15465, JP-A-59-75656, JP-A-60-169167, JP-A-61-156871, JP-A-61-253862 and JP-A-62-181467; "Optical interconnections for massively parallel architectures", Applied Optics, vol. 29, No. 8, pp. 1077–1093 (1990)).

A large-capacity free-space optical interconnection method has been proposed which uses the feature that light is propagatable through a medium-free free space. In the free-space interconnection, solid wiring using a three-dimensional space is possible, so that a great increase in the number of optical wiring conductors is expected compared to electric wiring and waveguide interconnections where the region of the passageway conductors is restricted to within a two-dimensional plane. In this free-space interconnection, two-dimensional active elements (semiconductor laser arrays, photodiode arrays, spatial optical modulation element arrays, drivers) are optically interconnected through passive elements (optical elements having the functions of imaging, and wave separation and combination) (in more detail, see "Optical interconnections for VLSI System" PROCEEDINGS THE IEEE, VOL. 72, NO. 7, JULY (1984), pp. 850–866 (1984); "Surface light emission semiconductor laser" Applied physics", vol. 60, No. 1, pp. 361–367 (1987); "Crossover networks and their optical implementation" Applied optics, vol. 27, No. 15, 1 August 1988, pp. 3155–3160); and Published unexamined Japanese patent applications JP-A-61-212059 and JP-A-61-500941).

The biggest problem of the free space interconnection is alignment. The freedom degree of interconnection in a three-dimensional space gives a three-dimensional freedom degree to alignment, so that an assembly system of bulk elements such as is encountered in a conventional precision optical system is difficult to provide stabilized alignment, and low in productivity. In the free space interconnection, active and passive elements are required to be aligned with high accuracy and then united. To this end, optical integrated elements which provide high alignment are required. The conventional techniques which integrate such optical and electric parts provide stacked planar optics which stack transmission type planar optic components (surface light emitting laser arrays, planar microlens arrays, selfox lenses, photodetection element arrays) having a two-dimensional array structure of FIG. 22 to compose a desired optical circuit, and planar optics which have optical devices formed on a planar surface by an LSI patterning technique (for example, see published unexamined Japanese patent application Japanese Patent Application No. 59-196047; "Stacked planar optics"; "an application of the planar microlens", Applied Optics, vol. 21, No. 19, 10 October (1982), p. 3456); "Integrated optical imagining system", Applied Optics, vol. 29, No. 14, p. 1988 (10 May 1990).

FIGS. 23A and 23B are a conceptual view of a planar optical integrated circuit, which has an optical system which, in turn, has a ceiling-bottom waveguide structure where light from a two-dimensional pattern put on a left-end input surface advances horizontally rightward while repeating total reflection at an upper and a lower inner surface to be imaged by two reflective lenses on a planar surface at a conventional 4-f arrangement incorporated into a thick waveguide. This structure is produced by writing a zone plate-like optical diffraction element, using electron beam exposure. In this case, the positioning of alignment of the respective elements is effected with the accuracy of patterning of the LSI.

FIG. 24 shows a conventional stacked reflective type integrated circuit composed of several superimposed planar substrates to integrate reflective elements compactly (39th Meeting of Applied Physical Society, Spring-lecture preprint No. 30, p-B-9, p. 844).

SUMMARY OF THE INVENTION

The planar optical integrated circuits have lenses and beam splitters formed on the same plane by the LSI patterning technique, so that the problem of alignment of the respective elements is solved. Since light enters the respective elements obliquely, however, the planar optical integrated circuit is an optical system which performs an out-of-axis imaging operation to thereby cause a problem of aberration. Thus, lens design is required which allows for aberration on the out-of-axis imaging operation ("Differential-limited blazed reflection diffractive microlenses for oblique incidence fabricated by electron-beam lithography", Applied Optics, Vol. 30, No. 25, p. 3643

(1991)). In a diffractive element, light is diffracted at an angle varying in dependence on its wavelength, so that a chromatic aberration is involved. Thus, the diffractive element is used only in the case of light of a single waveform. Recently, replacement of an optical diffractive element with an optical reflective element has been proposed to eliminate chromatic aberration (39th Meeting of Applied Physical Society, Spring-lecture, 30p-B-8, p. 844). The efficiency of light utilization of a regular diffractive element is low, so that a phase-type element is required to be devised. This applies to stacked planar optics. In the planar optics, the active and optical elements are formed on the same plane, so that the density of the active elements formed cannot be increased.

It is an object of the present invention to provide an optical integrated circuit improved in alignment and in productivity to perform free space interconnection.

In order to achieve the above object, the present invention provides a three-dimensional opto-electric integrated circuit including:

An active element substrate having a two-dimensional plane on which a plurality of active elements is disposed; a passive element formed separately from the two-dimensional plane, the passive element including a plurality of lenses disposed in correspondence to the plurality of active elements and reflective return means for performing an optical path separating operation and an optical turning-back reflective operation to allow rays of light from the active elements to sequentially pass through the lenses and to propagate through the active elements, whereby the propagation of rays of light through a free space is used to optically interconnect the active elements one to the other.

In another aspect of the present invention, a three-dimensional opto-electric integrated circuit including a first substrate having a plane on which a plurality of first actively operating optical elements is disposed; a second substrate having a plurality of second optical elements for interconnecting the first optical elements optically; and wherein the ray of light is arranged to enter the respective first optical elements at substantially a right angle to the surface and wherein the second optical elements having the function of changing the direction of the ray of light so as to propagate the ray of light substantially parallel to the plane of the first substrate.

As described above, the inventive opto-electric integrated circuit has a structure in which the active elements and the passive elements (the lenses and the reflective means) are formed on the two corresponding separated substrates. The active elements are formed by semiconductor techniques to ensure the positioning of the elements with their patterning accuracy while the positioning of the passive elements is ensured with their processing accuracy.

Incidence of the rays of light at right angles to the active elements avoids a decrease in the interconnection efficiency due to aberration.

In a further aspect of the present invention, a three-dimensional optical wiring interconnection method where a first substrate having an x-y plane on which at least two first optical elements are disposed and a second substrate on which a second optical element is disposed which optically interconnects said first optical elements one to the other cooperate to interconnect the first optical elements optically, wherein the second optical element focuses an image of one first element as an image onto another first optical element such that the focused image is erect in an x-axis direction and inverted in a y-axis direction perpendicular to the x-axis direction.

As described above, by control of focusing the image on the first optical (active) elements, the first optical elements and the second optical elements (passive elements) are aligned. The fabrication of a planar optical integrated circuit which is not greatly influenced by a deviation between the first and second elements is facilitated, using the effect of the horizontal or vertical inversion of a virtual image and inversion of the imaging relationship. In this case, even when an image focused so as to be erect in the x-axis direction and inverted in the y-axis direction perpendicular to the x-axis direction deviates in the x-axis direction, no imaging relationship collapses. When an image erect in the x-axis direction and inverted in the y-axis direction is again focused in the same optical system, an image erect both in the x and y-axis directions results. Although this image deviates in any of the x and y-axis directions, no imaging relationship collapses.

The second optical elements which interconnect the first optical elements include lenses which focus the rays of light on the first optical elements, and prisms which change the direction of the light to cause the rays of light from the lenses to propagate on the x-y plane. The lenses are preferably arranged in a one-to-one correspondence to the respective first optical elements such that the rays of light enter and leave the first optical elements at substantially right angles to the first optical elements. Prisms are provided which act as a reflective layer to turn back the rays of light. An optical system is formed which provides paraxial imaging without causing the rays of light to enter the imaging elements (lenses) obliquely to thereby reduce possible aberration. The optical elements include refractive index type ones so as to cope with the chromatic aberration easily, which facilitates design. The use of the refractive index type elements increases the efficiency of light utilization.

Provision of the optical branching means of the prisms serves to interconnect any ones of the first optical elements disposed on the x-y plane. The optical branching means may be either a filter layer or a reflective surface which refracts or reflects the rays of light selectively in accordance with its wavelength or polarization plane. For example, the prism may have thereon a film which reflects or refracts the rays of light in accordance with its wavelength or polarized state.

The active elements and the passive elements may be formed advantageously on corresponding separate substrates to prevent hindrance to an increase in the density of the active elements formed.

Preferably, all the interconnections are in a conjugate relationship to equalize the lengths of the optical paths to thereby eliminate a skew of signals. To this end, the active elements are required to cause their light receiving surfaces or light emitting surfaces to be positioned at the corresponding focal surfaces of the lenses, and the prisms are required to be placed in alignment with the lens pupil surfaces.

The active elements include various light emitting elements, photodiodes, optical switches, optical amplifiers, and optical chips made in the semiconductor integrating techniques. The passive elements include lenses and prisms made in the lump processing technique including molding and cutting, and semiconductor manufacturing techniques which include lithography, ion implantation, and electron beam exposure to improve mass productivity and processing accuracy.

BRIEF DESCRIPTION OF THE DRAWINGS

FIGS. 7A and 7B each illustrate an imaging relationship in the sequential propagation;

FIG. 8 is a perspective view of one embodiment of the present invention;

DETAILED DESCRIPTION OF THE PREFERRED EMBODIMENTS

Figure 1:
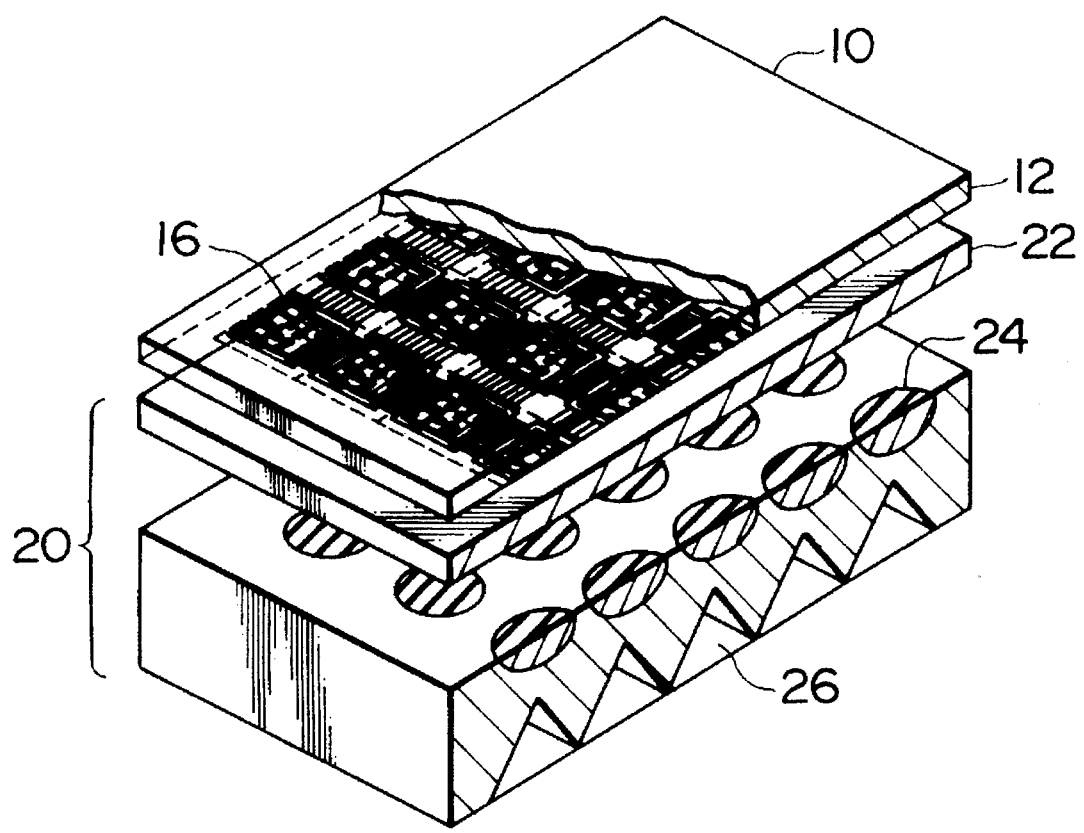
FIG. 1 is a perspective view indicative of the concept of the present invention.

As shown in FIG. 1, an opto-electric integrated circuit according to the present invention basically includes a two-dimensional active element group 10 (a substrate 12, a semiconductor laser array, a photodiode array, a spatial optical modulation array, and a driver, designated individually by 16) and a passive element group 20 (optical elements having imaging, wave-separating and wave-combining functions) which interconnects the respective active elements. The passive element group 20 at least includes lens means 24 having an imaging function, and reflective return means 26 each composed of a prism which separates the paths of rays of light and performs optical turning-back reflection.

The lens has the functions of collimating and focusing rays of light from a light source (not shown). The use of a plurality of such lenses brings about an imaging operation. The prism has the function of separating the paths of the rays of light which have passed through the lens, of turning back the rays of light to a plane where an active element is placed, and of causing the rays of light to enter another lens. Thus, the rays of light pass sequentially through the lenses to propagate through the respective spaces between the active elements. The lens has the function of inverting an image vertically. Reflection of the rays of light by the prism inverts an image vertically and horizontally. Thus, combination of lenses and prisms brings about an optical arrangement which provides an erect image at all times. Consequently, even when the active element and the passive element deviate from each other, desired active elements can be interconnected to each other.

The rays of light is in a paraxial relationship to a lens to cause the rays of light to enter the lens at substantially right angles to its surface due to turning-back of the rays of light by the prism, so that aberration is reduced and design is facilitated. The use of a refractive index type lens serves to correct chromatic aberration by combination of two mediums having different refractive indexes. The refractive index type lens has high efficiency of light utilization compared to diffractive type elements.

The active elements in the same imaging system are interconnected in a conjugate relationship, so that the lengths of their optical paths are equal to thereby achieve skew-free transmission.

In the present invention, all the active elements are formed on a flat surface, so that heat radiation and the density of the active elements formed are high.

Figure 2:
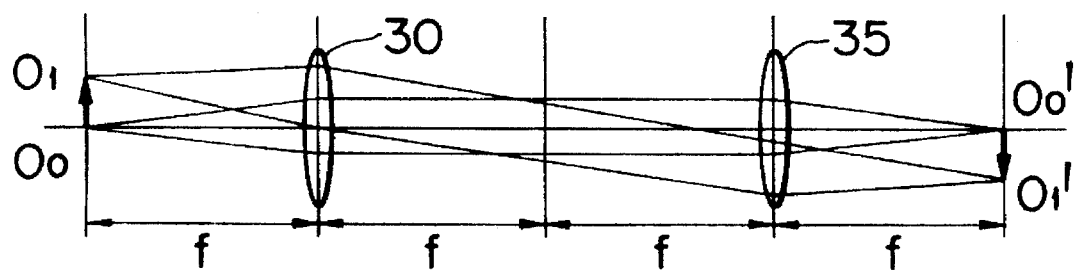
FIG. 2 shows an integrated optical system.

The operating principle of integrated optical systems in the present invention will be described in detail. An optical integrated circuit of one embodiment of the present invention includes optical systems including lenses in a 4-f arrangement of FIG. 2 and reflective return means which reflects the rays of light in a turning-back manner such that active elements disposed on the same plane are interconnected. When the two lenses have the same focal length in the 4-f arrangement, they focus the image of an object $O_0$–$O_1$ on an object plane as an inverted image $O_0'$–$O_1'$ on an image plane in the same size as the object. The object surface and the image plane are in a conjugate relationship to each other and the lengths of optical paths of all the rays of light are equal, and hence no skew of signals occur in the optical wiring in a conjugate relationship.

Figure 3A:
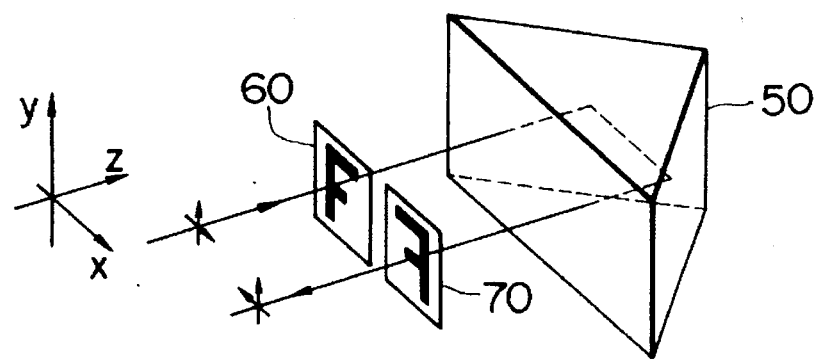
FIGS. 3A and 3B each are a perspective view indicative of a turning-back 4-f arrangement optical system using a right-angle prism, and its images.
Figure 3B:
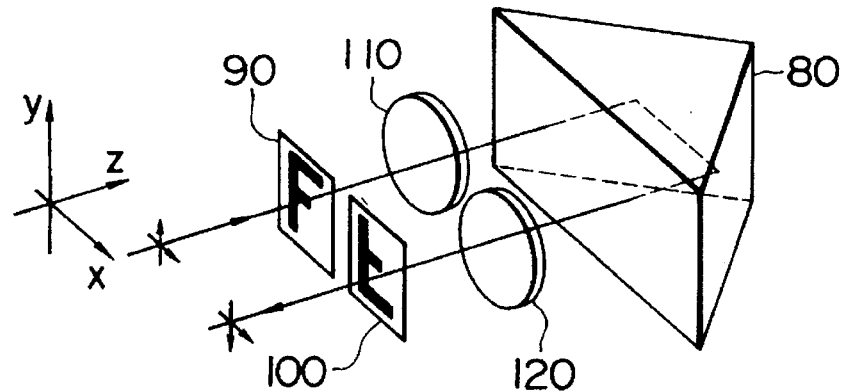

The reflective return means is realized by a prism, which is a unit of several plane mirrors combined and fixed such that no mutual positional relationship collapses. The plane mirrors act to alter the directions of the rays of light and the image. FIGS. 3A and 3B show changes in the path of rays of light passing through a right-angle prism as a typical one and in the directions of the images. In FIG. 3A, when rays of light emitted from an incident real image 60 enters a prism 50 and is reflected in a turning-back manner by the prism 50, a virtual image 70 is obtained on the exiting side. The virtual image 70 is erect compared to the real image 60 in the y-axis direction and inverted in the x-axis direction. As shown in FIG. 3B, when an imaging system is inserted to obtain a real image on the exiting side, a real image 100 is inverted compared to the real image 90 in the y-axis direction and erect in the x-axis direction. As just described above, the use of the prism provides a compact optical system.

Figure 4A:
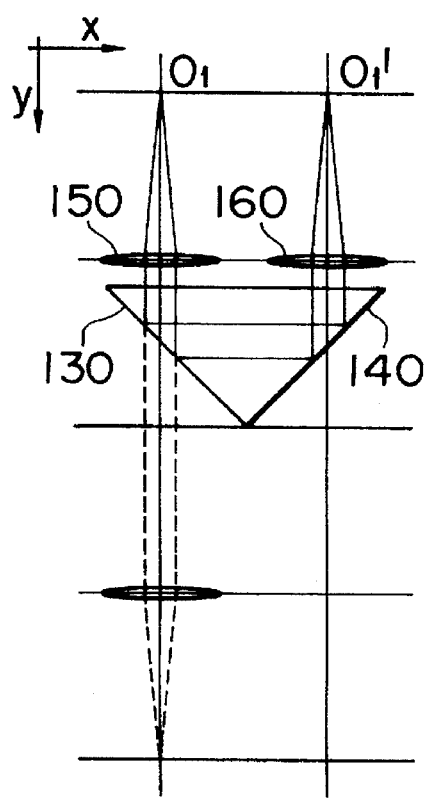
FIGS. 4A and 4B each illustrate the shifting characteristic of an image obtained in the 4-f arrangement optical system using the right-angle prism.
Figure 4B:
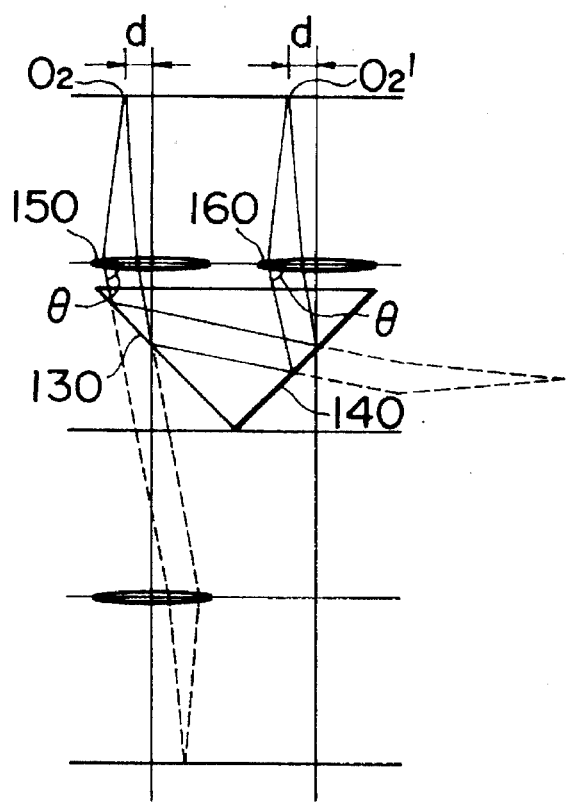

FIGS. 4A and 4B are an exploded view of the path of rays of light in the optical system of FIG. 3B. FIGS. 4A and 4B are a cross-sectional view of the FIG. 3B optical system taken along the x-z plane of FIG. 3B. The rays of light emitted from an object point $O_1$ on the optical axis are collimated by a lens 150, then reflected by plane mirrors 130, 140 to enter a lens 160 in parallel with the optical axis, and focused to a point $O_1'$ on the optical axis. As shown in FIG. 4B, rays of light emitted from an object point $O_2$ remote by a distance of d from the optical axis are collimated by the lens 150 so as to incline at an angle of θ to the optical axis. In addition, the collimated rays of light are then reflected by the plane mirrors 130 and 140 to enter the lens 160 at an angle of θ to the surface of the lens 160, and focused to an object point $O_2'$ remote by a distance of d from the optical axis of the lens 160. Thus, when the distance between the object points $O_1$ and $O_1'$ is equal to the distance between the object points $O_2$ and $O_2'$, and the distance between the active elements is maintained unchanged, the imaging relationship is maintained even when the active element deviates relative to the optical system in the x-axis direction.

Figure 5A:
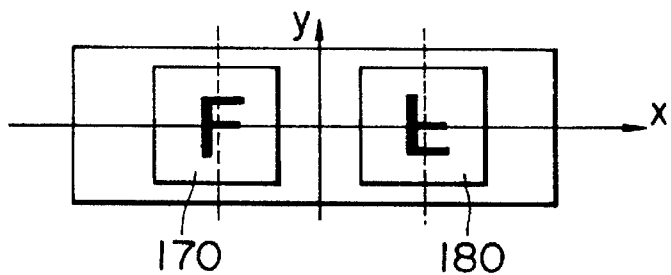
FIGS. 5A, 5B, 5C each illustrate the imaging relationship of a 4-f arrangement optical system using a right-angle prism.
Figure 5B:
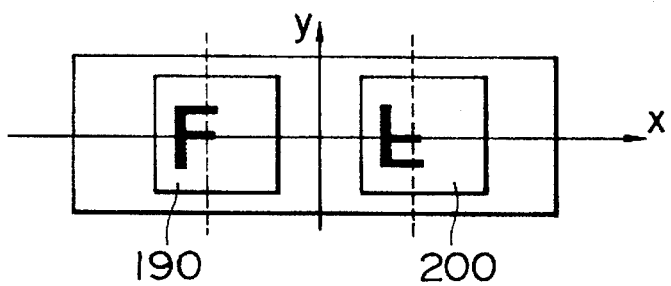
Figure 5C:
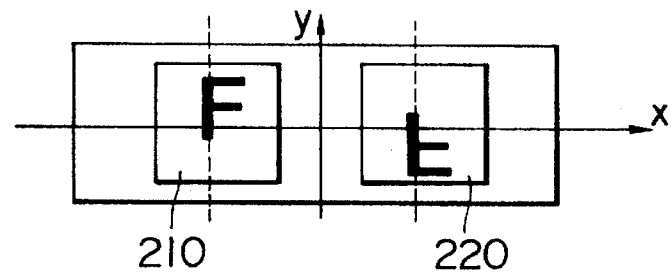

FIGS. 5A, 5B and 5C each show the imaging relationship of an image. In FIG. 5A, an output image 180 is inverted compared to an input image 170 in the y-axis direction, but erect in the x-axis direction. When the input image 170 is shifted in the negative direction of the x axis, as shown in FIG. 5B, the output image 200 is shifted by the same distance as the input image in the negative direction of the x axis. Thus, when this optical system is used as a passive element which interconnects the active elements, the accuracy of aligning the active and passive elements is not required to be high in the x-axis direction. However, as shown in FIG. 5C, when the input image 170 is shifted in the positive direction of the y axis, the output image 200 is shifted by the same distance as the input image in the opposite negative direction. Thus, the accuracy of aligning the active and passive elements is required to be high in the y-axis direction.

Figure 6:
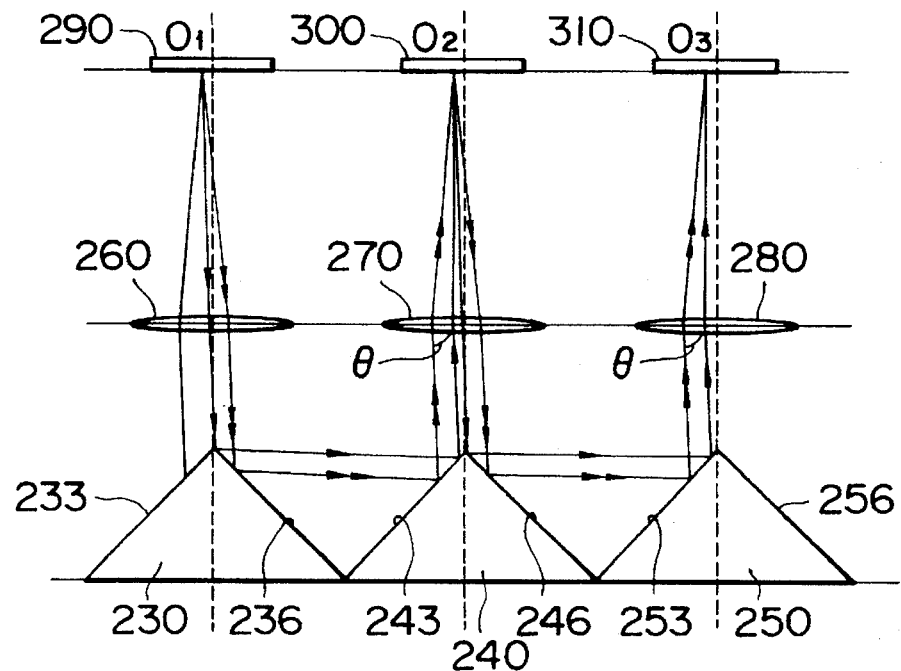
FIG. 6 illustrates rays of light propagating sequentially through the spaces between the active elements.

In the optical system of FIGS. 4A and 4B, the rays of light emitted from the object points $O_1$, $O_2$ are reflected at the points $O_1'$ and $O_2'$ to return to the object points $O_1$, $O_2$, respectively, which is repeated. Thus, only the interconnection of the image planes of the lenses 150 and 160 is permitted and no interconnections at other places are permitted. Thus, in order that the rays of light pass sequentially through the lenses to propagate through the respective spaces between the active elements, the embodiment of the present invention employs a prism arrangement of FIG. 6, in which the vertexes of the prisms align with the corresponding pupils of the lenses to separate the optical paths of the rays of light which have passed through the lenses. The rays of light emitted from the object point $O_1$ over the image plane of the lens 260 are collimated by the lens 260 and the optical paths of the collimated rays of light are separated by the prism 230. The rays of light reflected by the right-hand side 236 of the prism 230 are then reflected by the left-hand side of the prism 240 to enter the lens 270 at the same angle as the rays of light exits from the lens 260. Thus, the rays of light are focused onto the object point $O_2$ on the image plane of the lens 270. The rays of light entering the object point $O_2$ are reflected at the same angle at which the rays of light enters relative to the optical axis in obedience to the law of reflection. Thus, the rays of light pass through the lens 270 to be reflected by the right-hand side of the prism 240. Thereafter, similarly, the rays of light reach an object point $O_3$ with the aid of the prism 250 and the lens 280. That is, the rays of light sequentially pass through the lenses to propagate through the spaces between the respective active elements.

FIG. 7 shows the imaging relationship of the optical elements through which the rays of light are propagatable sequentially. FIG. 7 is a top plan view of the optical system of FIG. 6. When an input image 320 is put on an input plane 290, an output image 325 inverted in the y-axis direction and erect in the x-axis direction appears on a first exiting plane 300 with the aid of the lenses 260, 270 and the prisms 230, 240 of FIG. 6. The image 325 appears on a second exiting plane 310 as an image 330 erect both in the x- and y-axis directions with the aid of lenses 270, 280 and the prisms 240, 250. When the input image deviates, as shown at 335 in FIG. 7B, the image on the first exiting plane 300 deviates in the y-axis direction while the image on the second exiting plane 310 shifts by the same quantity in the same direction as the input image. Thus, the interconnection relationship of the input plane 290 and the second output plane 310 is maintained constant at all times. Thus, when two alternate imaging planes are used in this optical system, the accuracy of aligning the active and passive elements is not required to be high both in the x- and y-axis directions. When an image is rotated, however, the rotational angle of the output image is increased. Thus, when an image is rotated, a mechanism is required for ensuring the accuracy of aligning the active and passive elements. To obtain an optical system indicative of an imaging characteristic such as is just mentioned above, the prisms and lenses are required to be united with high accuracy.

FIG. 8 shows one embodiment of the present invention and a method of making it. Reference numeral 360 denotes an active element group on which a surface light emitting laser, a spatial optical modulator, a photodetector, a driver and an arithmetic circuit are integrated by a semiconductor process. Many of the optical elements are made of a compound semiconductor. When all the active elements are made of a compound semiconductor, the active element group 360 is made as a monolithic structure and integrated with the accuracy of semiconductor process rules. Drivers and arithmetic circuits made of a silicon semiconductor material are more excellent in integration and reliability than those made of a compound semiconductor material. Thus, electronic circuits and optical elements are preferably made of silicon and a compound semiconductor, respectively, as a monolithic structure on a silicon substrate. When the formation of compound semiconductor elements as a monolithic structure on the silicon substrate is difficult, the electronic circuits and the optical elements may be formed as a hybrid structure. When the active element group 360 is not integrated on the same substrate, a plurality of chips each including integrated optical elements may be formed as a hybrid structure in the semiconductor integrating technique.

The passive element group 380 is made of a transparent material such as glass. Lenses 382, 384, 386, 388 and 390 of the passive element group 380 are made in a molding or a cutting process. In the molding process, a surface of a transparent material is press-molded with a recessed mold. In the molding process, the use of an accurate mold brings about a group of lenses in a lump to thereby ensure high-accuracy optical-axial alignment and high productivity of the group of lenses.

Prisms 392, 394, 396, 398 and 400 of the passive element group 380 are formed of a V-like groove having an angle of 90 degrees in a lump by a cutter having a plurality of parallel V-like edges, ground so as to form the corresponding mirror surfaces, and then covered with a deposited high reflectivity material such as aluminum. Alternatively, a mold having a row of V-like grooves may be used to form such prism row in a molding process and a mirror surface may be formed on a respective one of the prism surfaces.

Figure 9:
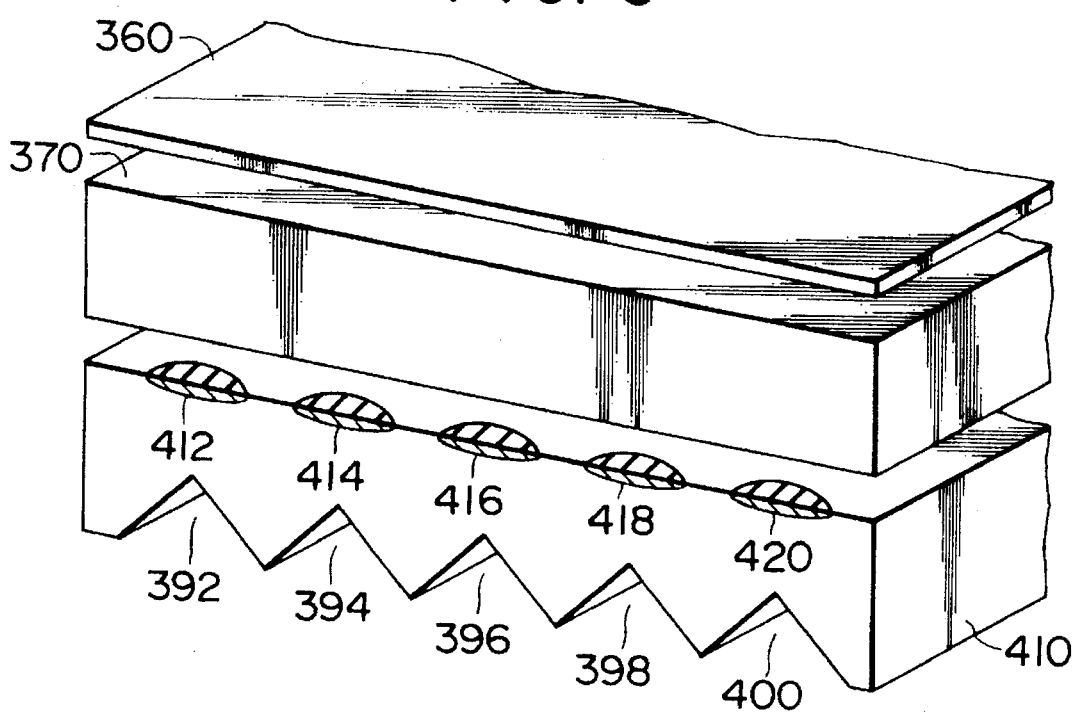
FIG. 9 is a perspective view of another embodiment of the present invention.

FIG. 9 shows another embodiment of the present invention in which the active element group 360 and spacer 370 are the same as those of FIG. 8, but a method of making the passive element group 410 is different from that of FIG. 8.

The lenses 412 414, 416, 418, and 420 of the passive element group 410 are made of a higher refractive index material than the substrate material. One making method includes the steps of forming lens surface-like recesses on one surface of a transparent substrate 410, and filling the recesses with a transparent resin material different in refractive index from the substrate, and polishing the surface of the filled resin or joining a spacer 370 to the filled resin to ensure flatness. Alternatively, the recesses may be formed by molding with a male mold or in an etching, a laser-working or a cutting process.

The high refractive index lenses may be made in an ion diffusion method, which includes steps of depositing a metal film on the glass substrate, forming circular windows in the semiconductor patterning technique, and dipping the resulting half-finished article into a melted salt containing dopant ions of Tl, Ag or Pb of a high refractive index to exchange the dopant ions through the mask windows with ions of a lower refractive index in the substrate to thereby provide a refractive index distribution in which the refractive index increases toward the mask windows.

Figure 10:
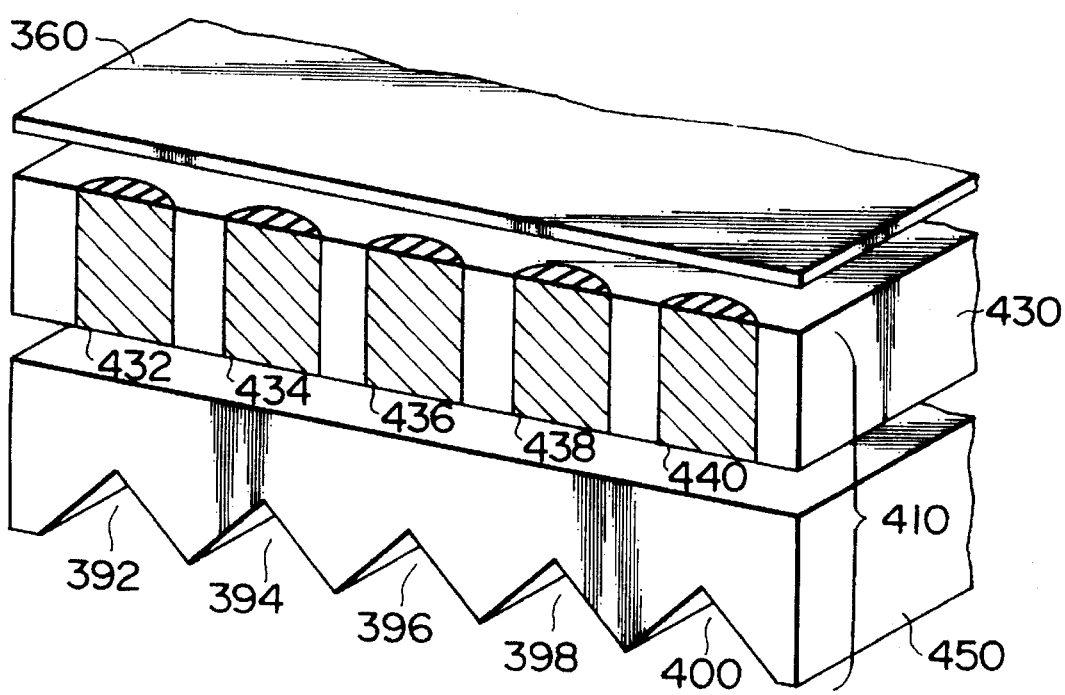
FIG. 10 is a perspective view of still another embodiment of the present invention.

FIG. 10 shows another embodiment of an integrated circuit according to the present invention, in which the active element group 360 of this embodiment is the same as that of FIG. 9, but the method of making the passive element group 410 is different from that of FIG. 9. The lenses 432, 434, 436, 438, and 440 in a fixing member 430 are composed of rod-like ones which are excellent in alignment because their end faces are flat. The refractive index of the rod-like lenses decreases away from the central axis of the rod. The rod-like lenses are inserted into corresponding holes in the fixing member 430 to form a lens array. Alternatively, a plurality of coaxial cylindrical lenses whose refractive indexes decrease sequentially away from the central axis of the lenses may be formed in a lump in the corresponding holes in the fixing member. Such unity of the rod-like lenses serves to align the optical axes of the respective lenses.

Figure 11:
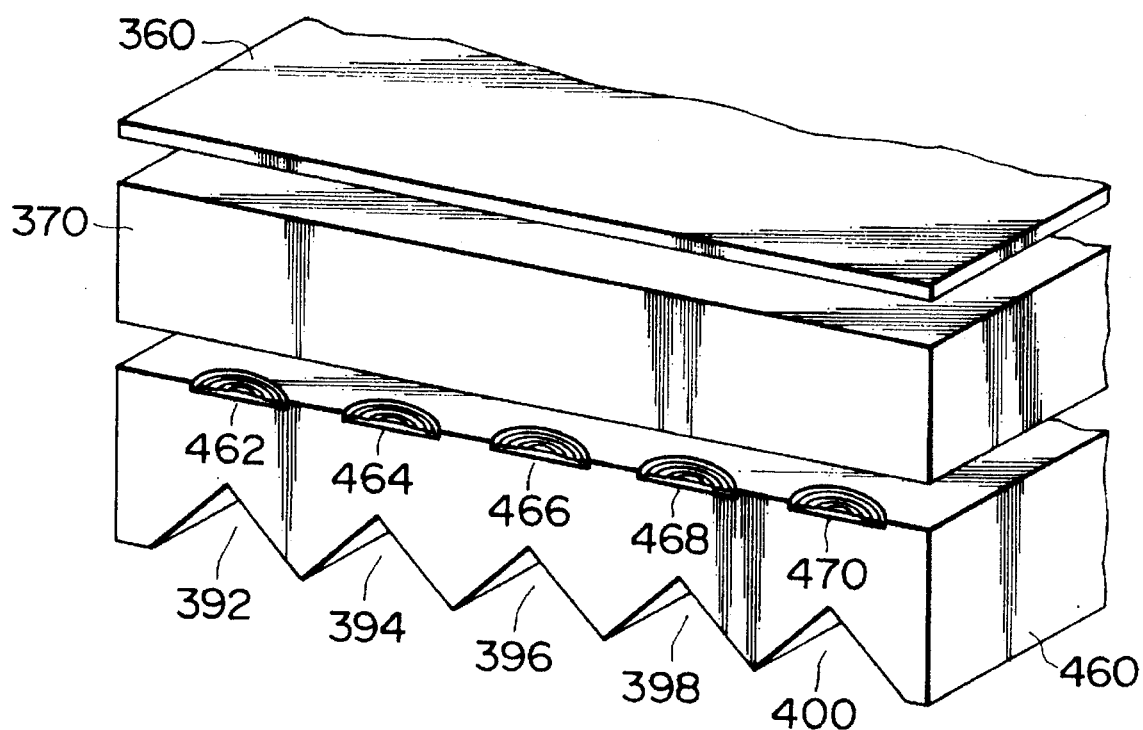
FIG. 11 is a perspective view of a further embodiment of the present invention.

FIG. 11 shows another embodiment of an integrated circuit according to the present invention, in which the active element group 360 and spacer 370 are the same as those corresponding ones of FIG. 9, but the method of making the passive element group 460 is different from that of FIG. 9. The lenses 462, 464, 466, 468, and 470 of the passive element group 460 are composed of corresponding diffractive Flesnel lenses which are made by a mold in a lump. The use of the semiconductor patterning technique including photolithography, electron beam exposure and ion implantation will provide such lenses of high accuracy.

Figure 12:
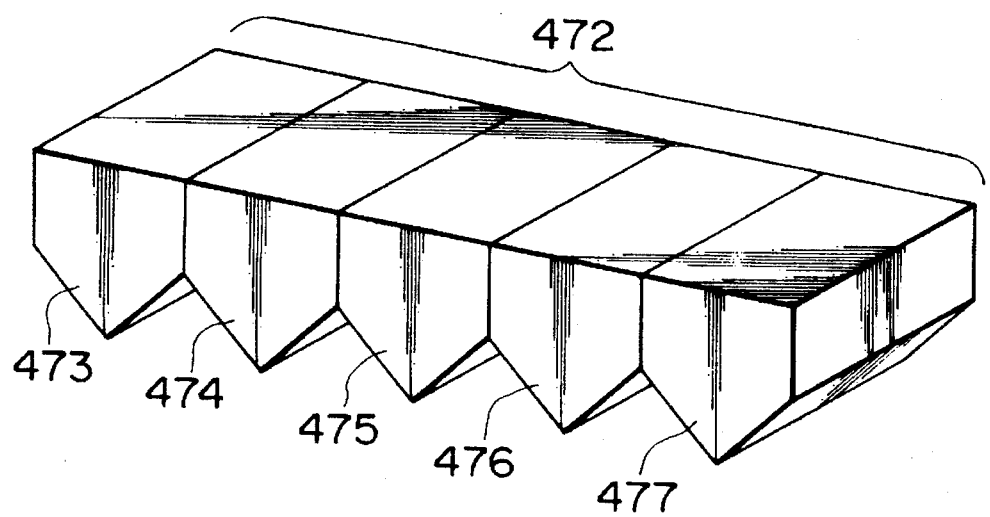
FIG. 12 is a perspective view indicative of a method of making a prism array.

FIG. 12 shows a further embodiment of the passive elements 460 in which a prism array 472 is composed of prisms 473–477 each having a right-angled V-like surface, one joined at a side to the other.

Figure 13:
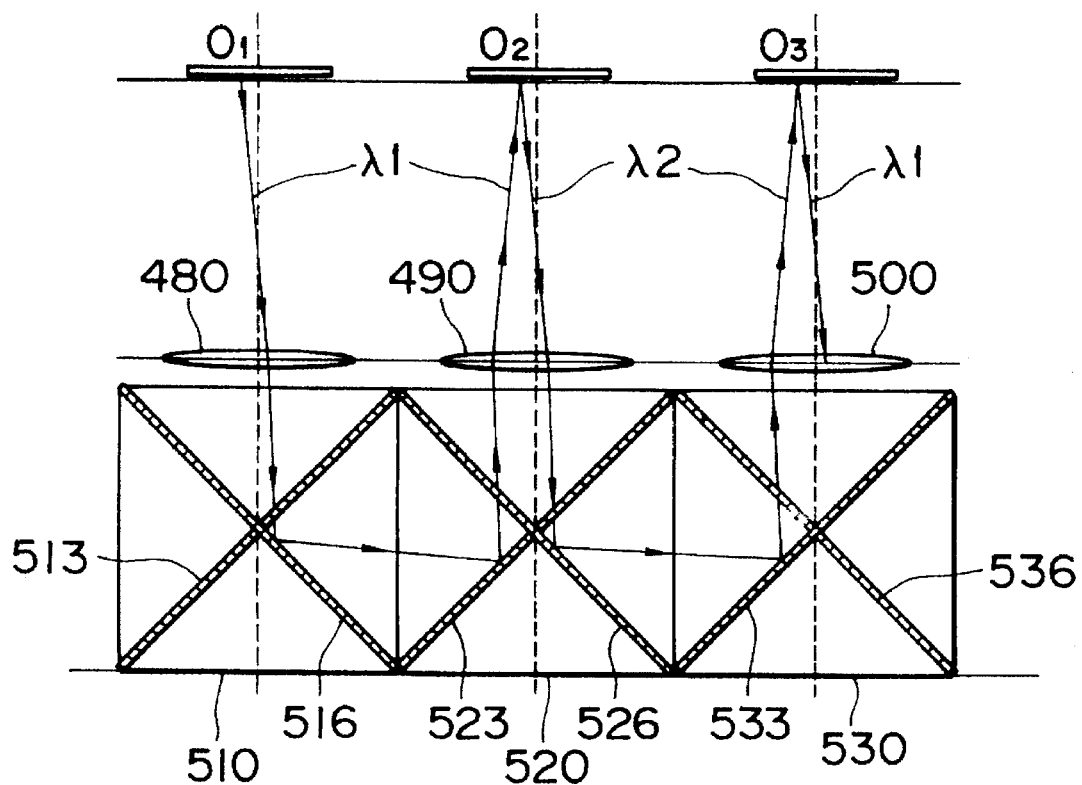
FIG. 13 shows rays of light sequentially propagating through a dichroic prism.

FIG. 13 shows another embodiment of the reflective return means according to the present invention. The reflective return means performs the separation of optical paths for rays of light and turning-back reflection of the rays of light which allows the rays of light to pass sequentially through the lenses and to propagate through the spaces between the respective active elements. The reflective return means is composed of dichroic prism arrays 510, 520 and 530. The dichroic prism arrays are disposed over the backs of the passive elements at the same intervals as the passive elements such that the prisms and the passive elements align. The dichroic prisms act to propagate rays of light having different wavelengths in different directions. The dichroic prisms 510, 520, 530 are disposed such that their surfaces 516, 523, 536 reflect rays of light having a wavelength of $\lambda 1$ and allow rays of light having a wavelength of $\lambda 2$ to pass therethrough while their surfaces 513, 526, 533 allow rays of light having a wavelength of $\lambda 1$ to pass therethrough and reflect rays of light having a wavelength of $\lambda 2$. The rays of light having a wavelength of $\lambda 1$ emitted from a light source $O_1$ pass through the surfaces 513, 526 and are reflected by the surfaces 516, 523 and focused onto the point $O_2$. When the rays of light are converted by the active element at the point $O_2$ to rays of light having a wavelength of $\lambda_2$, those rays of light from the point $O_2$ pass through the surfaces 523, 536 and are reflected by the surfaces 526, 533 and focused onto the point $O_3$. Thus, the use of the active elements including the waveform conversion means and the dichroic prism arrays allows the rays of light to pass sequentially through the lenses and to propagate through the respective spaces between the active elements.

Figure 14:
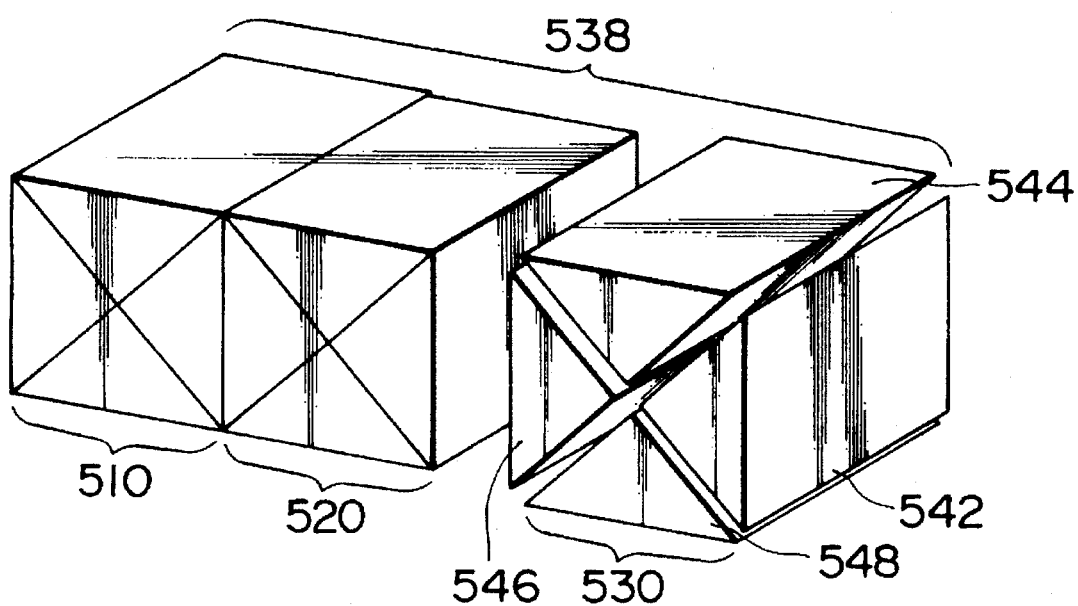
FIG. 14 shows a perspective view indicative of a method of making a dichroic prism array.

FIG. 14 shows a method of making an integrated dichroic prism array. Prisms 542, 544, 546 and 548 having a right-angled triangular cross section each are covered with a dichroic filter layer which separates the rays of light having different wavelengths $\lambda 1$ and $\lambda 2$, as shown in FIG. 13, and are combined so as to form a dichroic prism having a square cross section as a whole. A plurality of such dichroic prisms are joined at their sides one to the other to fix the prisms to thereby a form a prism array.

Figure 15:
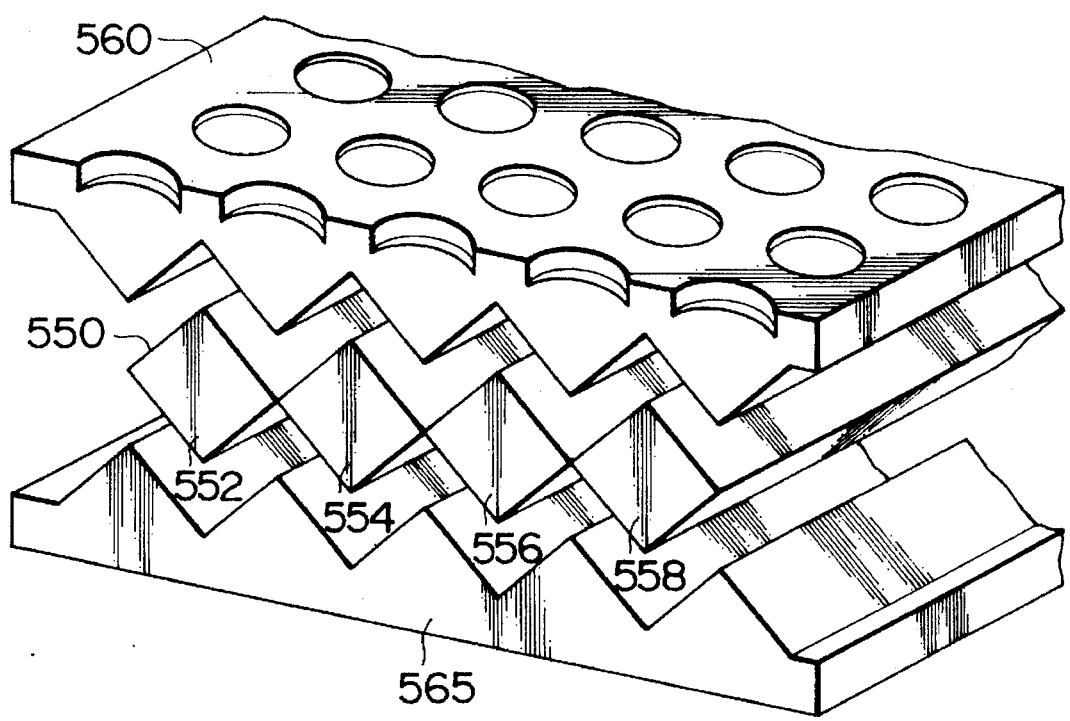
FIG. 15 is a perspective view indicative of a method of making a dichroic prism array in a lump.

FIG. 15 shows a method of making an integrated dichroic prism array in a lump. Blocks 550 (552, 554, 556, 558) having a square cross section each are covered with a dichroic filter layer which separates the rays of light having different wavelengths $\lambda 1$ and $\lambda 2$, as shown in FIG. 13, and are disposed so as to be engaged in corresponding V-like grooves formed on the back of a passive element 560. A fixing member 565 having V-like grooves complementary in shape to the blocks 550 is engaged with the blocks 550. Those members are then fixed so as to form a prism array.

Figure 16:
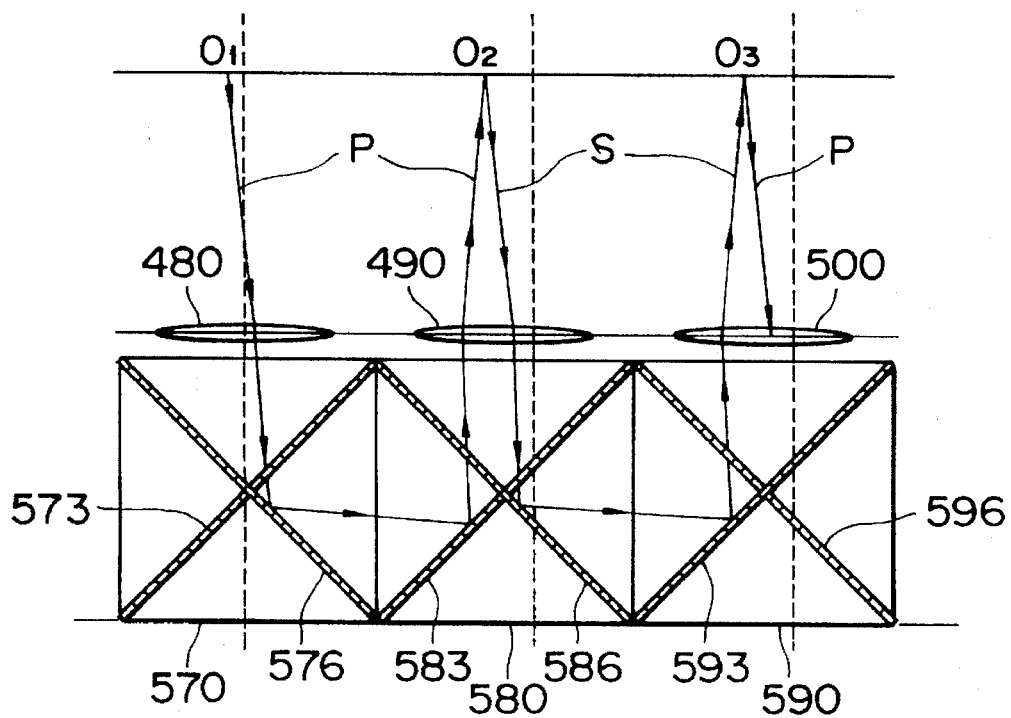
FIG. 16 shows rays of light sequentially propagating through a polarized beam splitter prism.

FIG. 16 shows another embodiment of the inventive reflective return means which performs the separation of optical paths for rays of light and turning-back reflection to allow the rays of light to pass sequentially through the lenses and to propagate through the spaces between the respective active elements. The reflective return means is composed of polarized beam splitter prism arrays 570, 580 and 590. The polarized beam splitter prism arrays are disposed over the corresponding backs of the passive elements at the same intervals as the passive elements such that the prism arrays and the passive elements align. The polarized beam splitter prisms act to propagate orthogonal polarized rays of light in different directions. The polarized beam splitter prism arrays 570, 580 and 590 are disposed and coated with a dielectric polarization film such that the surfaces 576, 583, 596 of the beam splitter prism arrays reflect P-polarized rays of light and allow S-polarized rays of light to pass therethrough while the surfaces 573, 586, 593 allows P-polarized rays of light to pass therethrough and reflect S-polarized rays of light. The P-polarized rays of light emitted from a light source $O_1$ pass through the surfaces 573, 586 and are reflected by the surfaces 576, 583 and focused onto the point $O_2$. When the rays of light are converted by the active element at the point O₂ to S-polarized rays of light, those S-polarized rays of light from the point O₂ pass through the surfaces 583, 596 and are reflected by the surfaces 586, 593 and focused onto the point O₃. Thus, the use of the active elements including the polarized beam splitter prism arrays and polarized rays of light conversion means allows the rays of light to pass sequentially through the lenses and to propagate through the respective spaces between the active elements.

The polarized beam splitter prism array may be made in a manner similar to the manner in which the dichroic prism array of FIG. 14 is made. Prisms 542, 544, 546 and 548 having a right-angle triangular cross section of FIG. 13 are coated with a dielectric polarization film which separates a P- and a S-polarization, as shown in FIG. 16. The method of integration of the prisms is the same as that of integrating the dichroic prisms.

The polarized beam splitter prism array may be made in a manner similar to the manner in which the integrated dichroic prism array of FIG. 15 is made. Blocks 550 (552, 554, 556 and 558) having a square cross section of FIG. 15 are coated with a dielectric polarization film which separates a P- and a S-polarization, as shown in FIG. 16. The method of integration of the prism arrays are the same as that of integrating the dichroic prism arrays.

In the inventive integrated circuit, the positional relationship of the active elements is ensured with the accuracy of the semiconductor process. The passive elements are formed in a fabricating process which is capable of performing a lump optical axis aligning operation and including the molding, etching, form transfer, photolithography, electron beam exposure, etc., so that the passive elements are integrated with high positional accuracy.

As described in detail with respect to FIGS. 5 and 7, two images formed at adjacent focused planes in a conjugate relationship are always inverted in the y-axis direction and erect in the x-axis direction due to vertical inversion of an image by the lenses which perform an imaging operation and horizontal inversion of the image by the reflective return means which performs the separation of optical paths for the rays of light and performs the turning-back reflection of the rays of light. Thus, the accuracy of aligning the active elements and the passive elements in the x-axis direction is not required to be high. When only two points in a conjugate relationship on two alternate imaging planes where an image erect both in the x- and y-axis directions is formed are to be optically interconnected, the accuracy of aligning the active and passive elements is not required to be high in the x- and y-axis directions. However, when the active elements and the passive elements are aligned by rotation, sufficient care must be taken to achieve high accuracy.

Thus, the image is inverted in the y-axis direction, so that high accuracy alignment is required only in the y-axis direction. Thus, if one direction is determined, no rotation required otherwise when the active and passive elements are aligned is required.

Figure 17:
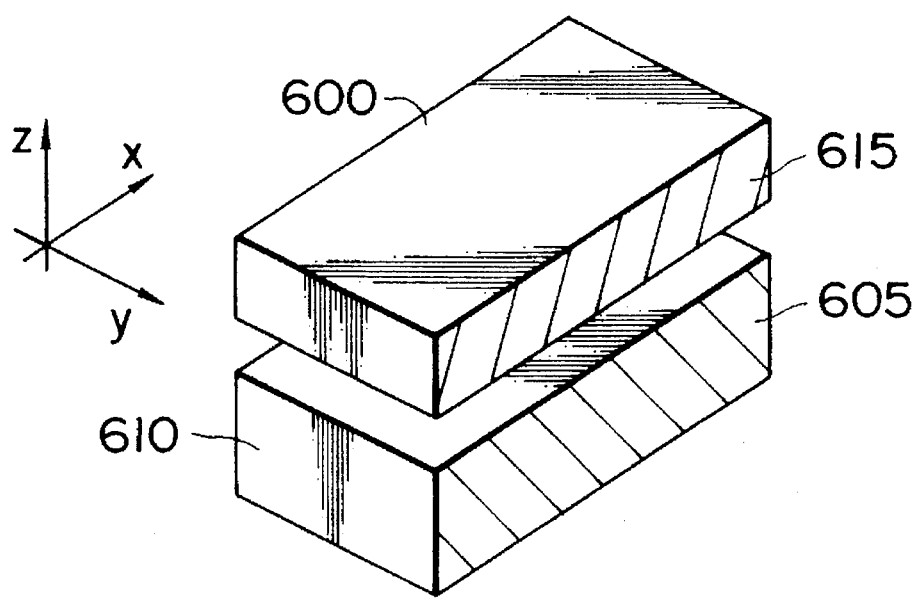
FIG. 17 is a perspective view indicative of alignment of passive elements.

Since in the present invention the alignment in the z-axis direction is controlled in accordance with the thickness of the elements, spacers can be used as the case may be. Thus, in order to achieve precise alignment of an active element group and a plurality of passive elements, if any, in one direction, the passive elements are required to be aligned with each other. A method of alignment for this purpose is shown in FIG. 17. In order to achieve high accuracy of alignment in the y-axis direction, a reference plane perpendicular to the y axis or parallel to the x axis is required to be provided. For example, as shown in FIG. 17, when passive elements 600, 610 are aligned, two surfaces 605, 615 parallel to the x axis are required to be aligned as a reference surface with high accuracy. Both those members are then joined.

Figure 18:
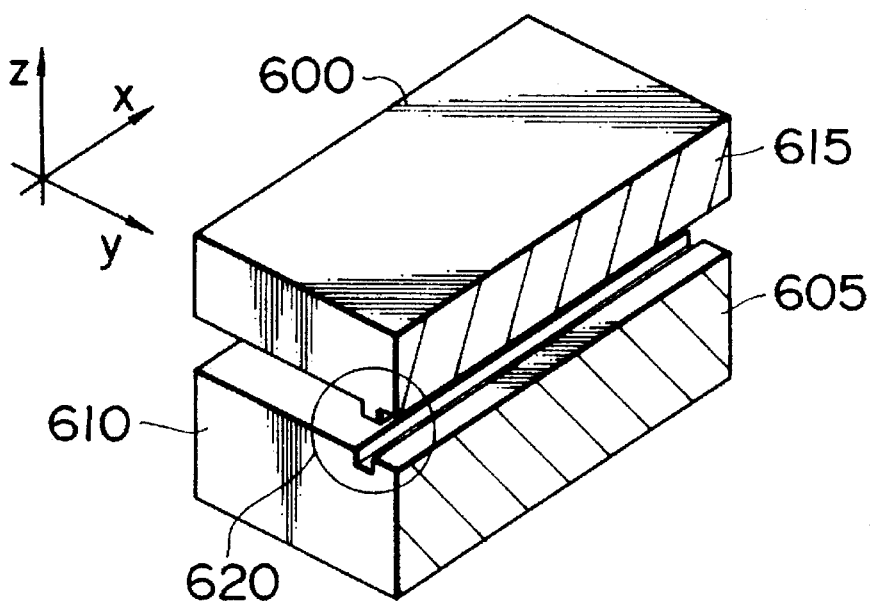
FIG. 18 is a perspective view indicative of alignment of passive elements using a groove.

As shown in FIG. 18, in order to achieve correct alignment, the passive elements 600, 610 may have a stop and a complementary groove which are at equal distances from the corresponding reference surfaces 615, 605 thereof to be united.

Figure 19:
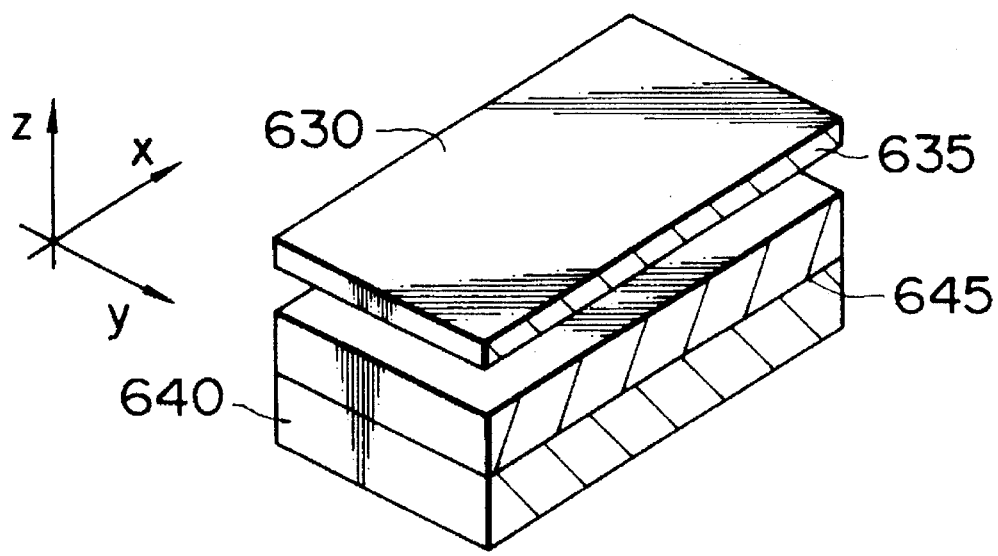
FIG. 19 is a perspective view indicative of a method of aligning an active and a passive element.

A method of aligning an active element with a passive element will be illustrated in FIG. 19. In this case, an active element 630 and passive elements 640 are superimposed such that their side surfaces 635 and 645 are on the same plane.

Figure 20:
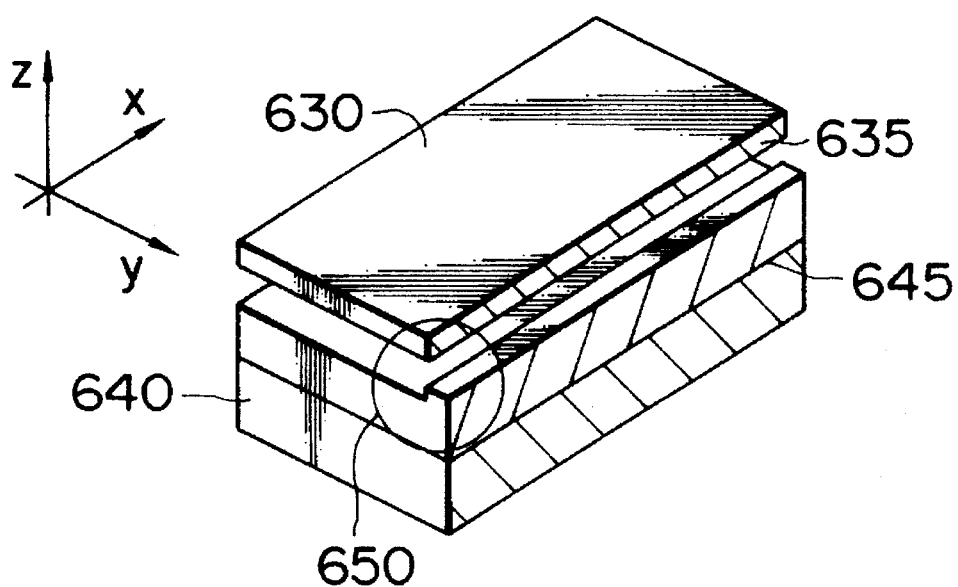
FIG. 20 is a perspective view indicative of a method of aligning an active and a passive element.

In FIG. 20, an active element 630 is placed on a passive element 640 such that the reference side surface 635 of the active element 630 is placed in contact with an inner side surface of a stop 650 of the passive element 640 parallel precisely to the reference side surface 645 of the passive element for aligning purposes.

Figure 21A:
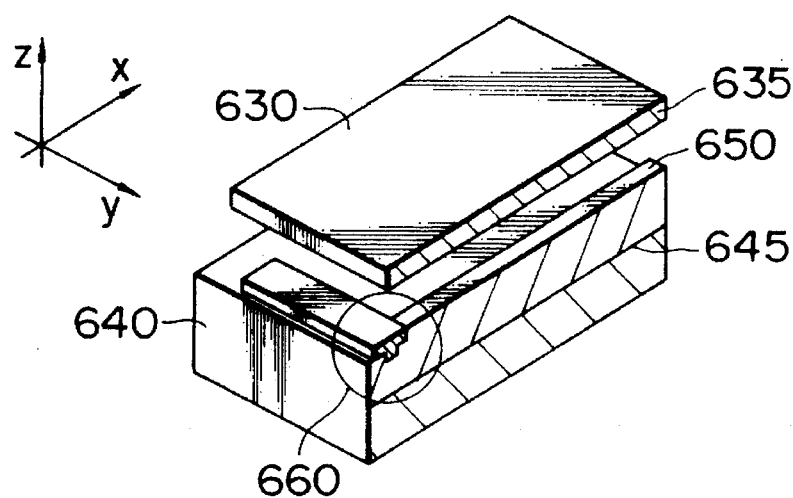
FIGS. 21A and 21B each are a perspective view indicative of a method of aligning an active and a passive element.
Figure 21B:
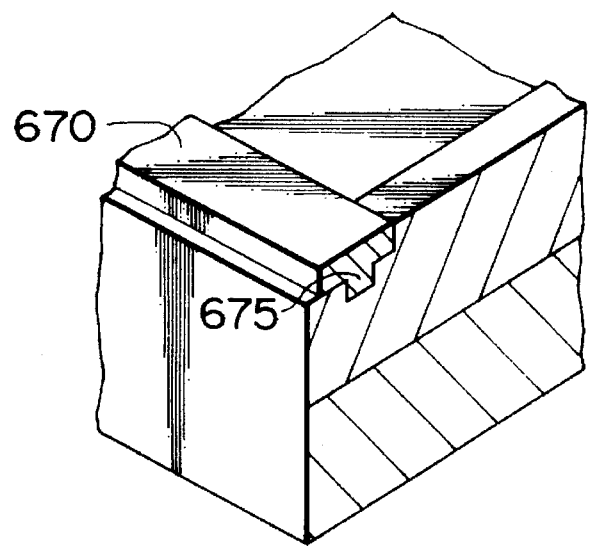
Figure 22:
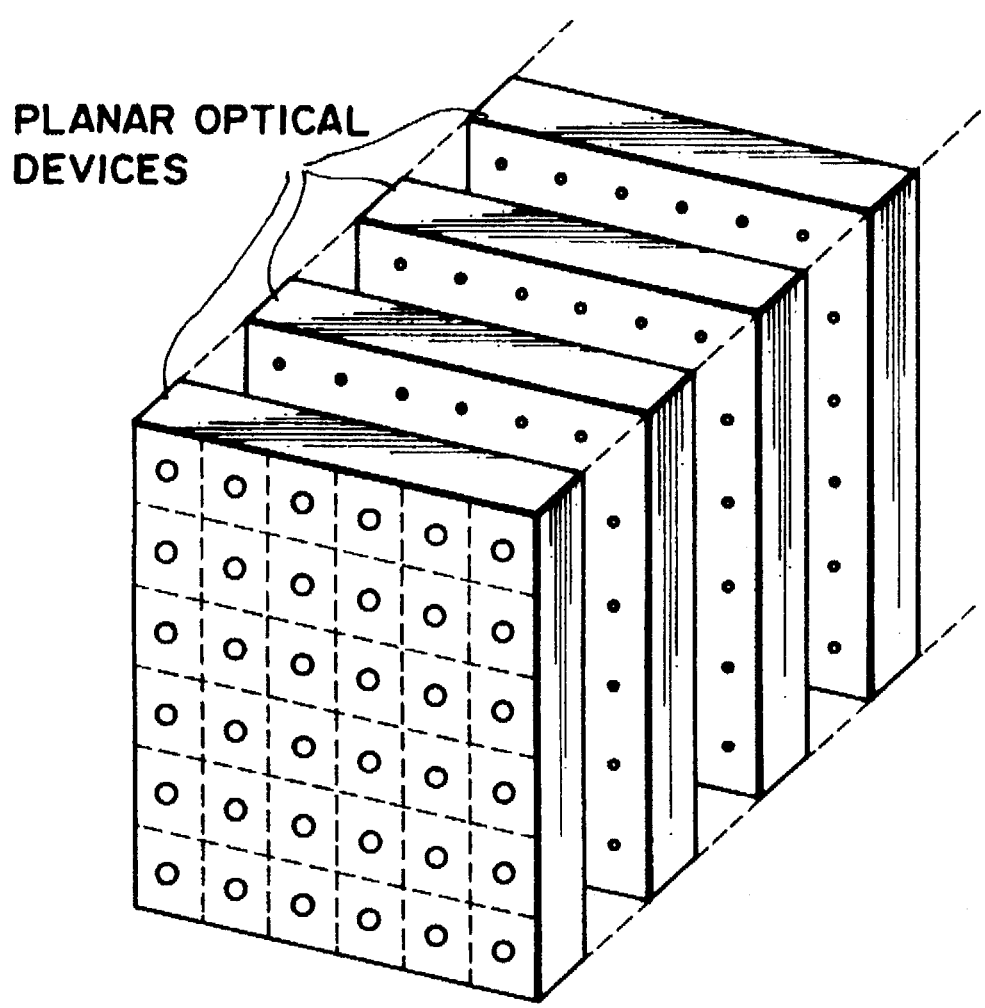
FIG. 22 shows a conventional technique.
Figure 23A:
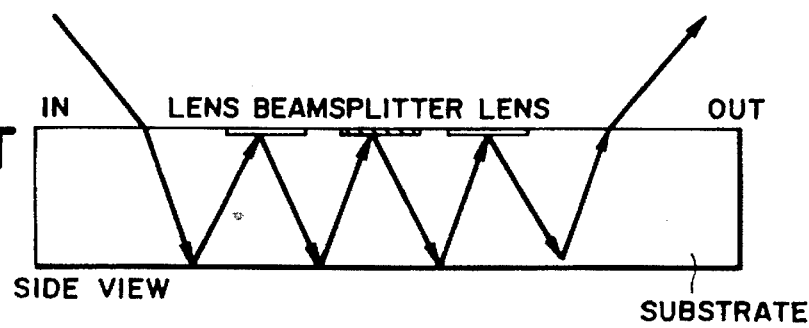
FIGS. 23A and 23B each show a conventional planar optical integrated circuit technique.
Figure 23B:
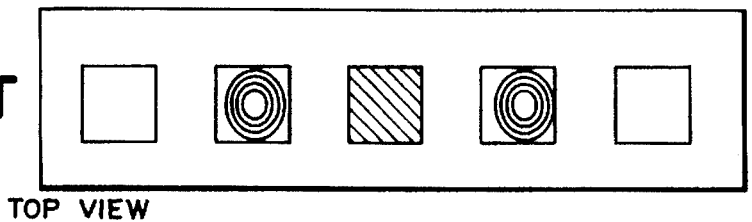
Figure 24:
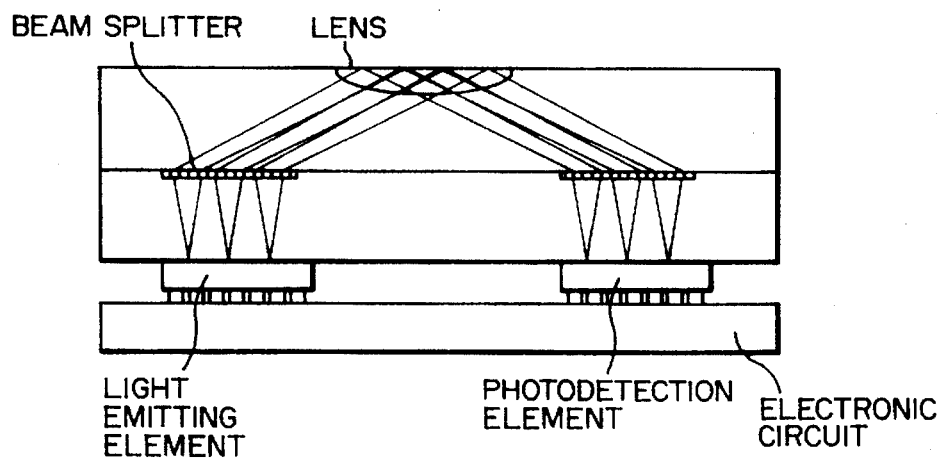
FIG. 24 shows a conventional planar optical integrated circuit technique.

While in the present invention high accuracy alignment is illustrated as required only in one direction, proper accuracy is required in another direction. Thus, as shown in FIGS. 21A and 21B, two stops 650 and 670 may be provided. In FIGS. 21A and 21B, a groove perpendicular to the reference surface of the element 640 receives the stop member 670, which leads to high accuracy alignment in two directions.

Since the invention is constructed, as described above, it provides an optical integrated circuit excellent in alignment and productivity, advantageously. Provision of an optical paraxial imaging system serves to suppress aberration. The use of a refractive index type optical element serves to reduce chromatic aberration. The formation of an integrated circuit including active elements dispersed on the same plane and the passive elements serves to radiate, with increased efficiency, heat produced by the active elements. Since the active elements are provided separately from the passive elements in the structure, an optical integrated circuit is provided in which the density of the active elements is high. An optical integrated circuit is provided where all the interconnections are in a conjugate relationship, the lengths of the optical paths are equal, and signal skews are free.

What is claimed is:

1. A three-dimensional opto-electric integrated circuit comprising:

an active element substrate having a two-dimensional plane on which a plurality of active elements is disposed;

a passive element formed separately from the two-dimensional plane, said passive element including a plurality of lenses disposed in correspondence to the plurality of active elements and reflective return means for performing an optical path separating operation and an optical turning-back reflective operation to allow rays of light from said active elements to sequentially pass through the lenses and to propagate through said active elements, whereby the propagation of rays of light through a free space is used to optically interconnect said active elements one to the other.

2. A three-dimensional opto-electric integrated circuit according to claim 1, wherein said active elements are disposed at the corresponding focal points of said lenses and wherein said reflective return means is arranged such that the optical distance between any two adjacent lenses is twice the focal length of those lenses.

3. A three-dimensional opto-electric integrated circuit according to claim 1, wherein two imaging characteristics at corresponding points in a conjugate relationship on the focusing surfaces of adjacent lenses bring about optical arrangements which are opposite to each other in the y-axis direction and erect in the x-axis direction by the inversion of an image about both axes by said adjacent lenses and the invention of the image about one axis by said recursive reflective means.

4. A three-dimensional opto-dimensional integrated circuit according to claim 1, wherein only two points in a conjugate relationship on corresponding imaging surfaces of alternate lenses which focus images erect both in the x- and y-axis directions due to the inversion of an image about both axes by those lenses and the inversion of the image about one axis by said reflective return means are optically interconnected.

5. A three-dimensional opto-electric integrated circuit according to claim 1, wherein said lenses each include a convex surface formed on a surface of said substrate.

6. A three-dimensional opto-electric integrated circuit according to claim 1, wherein said lenses each include a material placed on the surface of said substrate and having a larger refractive index than said substrate.

7. A three-dimensional opto-electric integrated circuit according to claim 1, wherein said lenses each include a rod-like lens.

8. A three-dimensional opto-electric integrated circuit according to claim 1, wherein said lenses each include a Fresnel lens.

9. A three-dimensional opto-electric integrated circuit according to claim 1, wherein said reflective return means comprises a right-angle prism array of right angle prisms disposed at the same interval as said lenses such that the right-angle vertexes of said prisms align with the corresponding centers of said lenses.

10. A three-dimensional opto-electric integrated circuit according to claim 1, wherein said reflective return means comprises a dichroic prism array which, in turn, comprises four right-angle prisms pasted together, each of the two surfaces of each prism defining its right angle having a filter layer formed thereon for separating rays of light having different wavelengths or planes of polarization.

11. A three-dimensional opto-electric integrated circuit according to claim 1, wherein said reflective return means comprises a combination of a plurality of first blocks each having a square cross section and having a filter layer formed thereon for separating rays of light having different wavelengths or planes of polarization, and a second block having a plurality of right-angled V-like grooves which receive said plurality of first blocks such that the grooves align with the corresponding lenses.

12. A three-dimensional opto-electric integrated circuit according to claim 1, wherein said reflective return means propagates rays of light in different directions on the basis of the polarization or wavelength of the rays of light.

13. A three-dimensional opto-electric integrated circuit comprising:

a first substrate having a plane on which a plurality of first actively operating optical elements is disposed;

a second substrate having a plurality of second optical elements for interconnecting said first optical elements optically; and wherein the ray of light is arranged to enter said respective first optical elements at substantially a right angle to the plane and wherein said second optical elements having the function of changing the direction of the ray of light so as to propagate the ray of light substantially parallel to the plane of the first substrate.

14. A three-dimensional opto-electric integrated circuit according to claim 13, wherein said second substrate comprises a plurality of lenses disposed in one-to-correspondence to said plurality of first optical elements, the first optical elements being disposed such that their light receiving or emitting surfaces align with the corresponding focal surfaces of said lenses, said second optical elements change the direction of the ray of light from said lenses such that the ray of light propagates in substantially parallel with the plane or change the direction of the ray of light propagating in substantially parallel with the plane such that the ray of light enters said lenses at substantially a right angle to said lenses.

15. A three-dimensional opto-electric integrated circuit according to claim 13, wherein said second optical elements each optically interconnects adjacent lenses at an optical distance which is substantially twice the focal length of said lenses.

16. A three-dimensional optical wiring interconnection method comprising the steps of:

disposing a plurality of first actively operating optical elements on a plane;

causing rays of light to enter said first optical elements at substantially a right angle to the plane, changing the direction of rays of light from said first optical elements, such that the rays of light propagate substantially in parallel with the plane or changing the direction of the rays of light which propagate substantially in parallel with the plane such that the rays of light enter said first optical elements at substantially a right angle to thereby interconnect optically said plurality of first optical elements through the plurality of second optical elements.

17. A three-dimensional optical wiring interconnection method according to claim 16, wherein said first optical elements are interconnected to each other by said corresponding second optical elements in an optically conjugate relationship.

18. A three-dimensional optical wiring interconnection method where a first substrate having an x-y plane on which at least two first optical elements are disposed and a second substrate on which a second optical element is disposed which optically interconnects said first optical elements one to the other cooperate to interconnect said first optical elements optically, wherein said second optical element focuses an image of one first element as an image onto another first optical element such that the focused image is erect in an x-axis direction and inverted in a y-axis direction perpendicular to the x-axis direction.

19. A three-dimensional optical wiring interconnection method according to claim 18, wherein when the first and second substrates are aligned, sides of the substrates parallel to the x-axis direction, a key groove or a stop is used.

* * * * *